3,257,352
VULCANIZATION OF POLYETHYLENE WITH PEROXIDES AND COMPOUNDS CONTAINING CONJUGATED DIENE AND CARBONYL GROUPS
Johannes H. Ottenheym and Johan W. F. van 't Wout, Sittard, Netherlands, assignors to Stamicarbon N.V., Heerlen, Netherlands
No Drawing. Filed Aug. 11, 1961, Ser. No. 130,766
Claims priority, application Netherlands, Aug. 11, 1960, 254,803
15 Claims. (Cl. 260—41)

The present invention relates to a process for the vulcanization of polymers, such as substantially saturated polymers, by which term are meant homopolymers or copolymers of ethylene, propylene, butylene-1, isobutylene, styrene, acrylonitrile, vinylacetate and the like, which have been produced for example with the aid of Ziegler catalysts and contain so few double bonds that they cannot be vulcanized with the aid of sulphur only. The invention particularly relates to the vulcanization of co-polymers of ethylene and/or butylene-1 prepared with the aid of Ziegler catalysts.

According to United States patent specification 2,710,291 a saturated polymer, namely polyisobutylene, can be vulcanized with an organic peroxide and sulphur.

Another method of vulcanizing unsaturated polymers is known from the British patent specification 608,333, according to which an ethylene polymer is vulcanized by heating it at 100–250° C. in the presence of an inorganic peroxide and a saturated organic acid, such as stearic acid, an unsaturated acid, such as, for example, oleic acid, or a dicarboxylic acid, such as suberic acid.

Further, from the French patent specification 1,200,144, it is known that saturated polymers may be vulcanized with a source of free radicals, such as a peroxide and an unsaturated acid. According to said patent, maleic acid is preferably used as the unsaturated acid, as the addition of this acid (see the Tables 2 and 3) produces, by far, the highest tensile strength. Benzoyl peroxide is almost exclusively used as the source of free radicals. It is preferred, moreover, to add a substance which can form the so-called salt bridges between the polymer chains, such a substance being a glycol, a diamine or a metal oxide, preferably, zinc oxide. Addition of the last-mentioned substance has a particularly great effect: as appears from Table 8 of said French patent, addition of 5 percent by weight of ZnO raises the tensile strength from 38 to 100 kg. per cm.$^2$. It is believed that the zinc oxide forms salt-bridges together with the maleic anhydride groups grafted onto the polymer chain.

Hence, this French Patent 1,200,144 prefers a vulcanization process which is carried out in two steps, as follows:

(a) Heating of the polymer, the peroxide and the maleic acid, whether or not in the dissolved state, at a temperature—in most cases 160° C.—at which the peroxide is decomposed, preferably completely, and a grafted polymer is formed, and
(b) Heating of the grafted polymer, also at approximately 160° C., together with ZnO and/or a filler, such as carbon black and/or an anti-oxidant.

The fact that the use of, for example, carbon black cannot possibly disturb the decomposition of the peroxide— since the carbon black is not present during this decomposition (see French patent p. 7, first column, 3rd paragraph etc.)—is considered advantageous. Accordingly in the examples in which carbon black is added, that is to say, Examples 15, 17 and 19, of said French patent, this addition only takes place in the second step.

The aim of the present invention is to provide a process for carrying out the vulcanization with the aid of a filler, such as carbon black, in one step, as a result of which there can be obtained a product which possesses good mechanical properties, in particular, a high tensile strength, and moreover, there can be omitted the addition of substances which serve to form salt bridges.

The process according to the present invention for vulcanizing polymers, in which the polymer is heated at 100– 250° C. together with a source of free radicals and an unsaturated compound, is characterized in that the unsaturated compound used is a substance having the general formula R—CH=CH—CH=CHX, in which formula R represents an alkyl or aryl group, and X a carboxyl group, an aldehyde group, an acid chloride group (—COCl), an acid amide group (—CONH$_2$), or an ester group, and in that a filler is also present during heating. Preferably sorbic acid ($R$=methyl and $X$=carboxyl) or an ester of this acid is used as the unsaturated compound.

The amount of unsaturated compound can vary within wide limits. Addition of less than 0.5 percent by weight of the unsaturated compound with respect to the polymer causes a definite rise in the tensile strength, but it does not bring it to a level which is sufficiently high for most purposes. On the other hand, addition of more than 20 percent by weight reduces the tensile strength. Preferably, there is added 1–5 percent by weight of the unsaturated compound with respect to the polymer, as in that case the tensile strength will be satisfactory, while an economically attractive amount of the unsaturated compound is used.

Well-known sources of free radicals are inorganic peroxides, organic azo-compounds and organic peroxy-compounds, such as hydroperoxides, dialkyl peroxides, diaralkyl peroxides, peroxy-acids, peroxy-esters, diacyl peroxides, diaroyl peroxides, and peroxide derivatives of aldehydes and ketones. Preference is given to dialkyl peroxides, diaralkyl peroxides and alkylaralakylperoxides, such as dicumyl peroxide, ditertiary-butyl peroxide, tertiarybutyl cumylperoxide, and 2,5-bistertiarybutyl peroxy-2,5 dimethylhexane. Of these four peroxides the cumyl peroxides give the best results. This is very remarkable, as vulcanization of an ethylene-propylene co-polymer with dicumyl peroxide, 10 percent by weight of maleic anhydride and 50 percent by weight of carbon black does not raise the tensile strength and even increases the permanent deformation due to elongation, as compared with the product resulting from vulcanization of an otherwise identical mixture which does not contain maleic anhydride.

The amount of peroxide can vary within wide limits. The best results are obtained if there be used 1–6% of the peroxide with respect to the polymer.

Depending on the decomposition velocity of the free radical source, the vulcanization temperature is preferably chosen between 120 and 210° C. With cumyl peroxide, for instance, very good results are obtained if the vulcanization is carried out at 150–170° C. during a period of 5–60 min.

The well-known strengthening fillers used with natural rubber and synthetic rubbers, such as carbon black, silicon oxide, calcium carbonate, calcium silicate, aluminium silicate or colloidal clay, can also be used with the present invention. Very good results are obtained with carbon black, preferably, a fine-grained carbon black of the "super abrasion furnace" or "high abrasion furnace" type. In addition, there can be used other customary auxiliary substances, such as sulphur stearic acid, softeners—such as mineral oils or oil—anti-oxidants, or dyes, may be used.

The aim of the following example is to illustrate the invention, but not to restrict it. Unless otherwise indicated, the word parts means parts by weight. The stress at 300% elongation, the tensile strength, and the elongation at rupture were determined in accordance with the British standard specification B.S. 903: Part A2: 1956: "test piece" C; the only difference being that the rate of traverse of the driven grip was 30 cm./min.

*Example 1*

100 parts of an amorphous ethylene-propylene co-polymer with an inherent viscosity of 7.6 (measured on a solution of 0.1 g. of co-polymer per 100 ml. of decaline at 135° C.) were mixed on the roller at a temperature of appr. 80° C. with:

10 parts of softener,
50 parts of a "super abrasion furnace" (trade mark "Vulcan 9"),
10 parts of a 40% dicumyl peroxide product (trade mark "Perkadox BC 40") and
0–12.5 parts of sorbic acid.

Plates made of the resulting mixture and measuring 120 × 120 × 2 mm. were vulcanized in a press during a period of 30 minutes and at a temperature of 160° C.

A specification of the mechanical properties of the vulcanzed plates is given in Table 1.

TABLE 1

| Sorbic acid (percent by weight) | 0 | 5 | 7.5 | 10 | 12.5 |
|---|---|---|---|---|---|
| Stress at 300% elongation (kg./cm.²) | 52 | 90 | 68 | 53 | 56 |
| Tensile strength (kg./cm.²) | 140 | 196 | 200 | 206 | 223 |
| Elongation at rupture (percent) | 538 | 472 | 550 | 617 | 653 |

If, departing from the process according to the invention, this experiment is carried out in the absence of the carbon black, a product with a tensile strength of only 38 kg./cm.² is obtained.

*Example 2*

100 parts of an ethylene-propylene co-polymer with an inherent viscosity of 2.6 were mixed on the roller at a temperature of appr. 80° C. with:

50 parts of "Vulcan 9",
4 parts of dicumyl peroxide and
0–20 parts of sorbic acid.

The mixtures obtained were culcanized as described in Example 1.

A specification of the mechanical properties of the resultant vulcanized plates is given in Table 2.

TABLE 2

| Sorbic acid (percent by weight) | 0 | 2 | 5 | 10 | 15 | 20 |
|---|---|---|---|---|---|---|
| Stress at 300% elongation (kg./cm.²) | 86 | | 100 | 109 | 51 | 51 |
| Tensile strength (kg./cm.²) | 115 | 143 | 161 | 203 | 187 | 144 |
| Elongation at rupture (percent) | 368 | 309 | 410 | 450 | 648 | 608 |

From Table 2 it appears that addition of more than 20 percent by weight of sorbic acid reduces the tensile strength.

If, in addition to 10 percent by weight of sorbic acid, 2.0, 5.0 or 10 percent by weight of ZnO be added to the mixture, then, the tensile strength of the vulcanized product is reduced to 162, 128 or 103 kg./cm.², respectively. In contrast to what is mentioned in the French Patent 1,200,144, this addition does not have a positive, but a strongly negative effect.

If, departing from the process according to the invention, 10 percent by weight of maleic anhydride instead of sorbic acid be used in the experiment referred to in Table 2. Then, the resulting tensile strength will only be equal to that of the product obtained without addition of sorbic acid (115 kg./cm.²), while the permanent deformation after 100% elongation, measured after 60 minutes, is even increased.

*Example 3*

100 parts of an ethylene-propylene copolymer containing 36 mole percent of propylene and having an inherent viscosity of 2.9 were mixed on the roller with:

50 parts of carbon black (trade name "Vulcan 6"),
3 parts of dicumyl peroxide, and
0–10 parts of sorbic acid (melting point 134° C.).

The resulting mixtures were vulcanized as described in Example 1.

Table 3 shows the mechanical properties of the resultant vulcanized plates.

TABLE 3

| Sorbic acid (percent by weight) | 0 | 1 | 2 | 5 | 10 |
|---|---|---|---|---|---|
| Stress at 300% elongation (kg./cm.²) | 57 | 86 | 128 | 87 | 109 |
| Tensile strength (kg./cm.²) | 99 | 151 | 155 | 154 | 155 |
| Elongation at rupute (percent) | 450 | 434 | 343 | 489 | 398 |
| Permanent deformation after 200% elongation over a period of 24 hours, measured after one hour | 24 | 20 | 16 | 22 | 22 |

The sorbic acid used in this case contained two trans double bonds. However, good results are also obtained with sorbic acid having—as reckoned from the carboxyl group—cis-trans, trans-cis, and cis-cis double bonds in succession, or with mixtures of these types of sorbic acid.

*Example 4*

There is used the mixture described in Example 3, with, however, 0–10 parts of the ethyl ester of sorbic acid instead of sorbic acid. The mixture is vulcanized in the way described in Example 1.

Table 4 gives the mechanical properties of the resultant vulcanized plates.

TABLE 4

| Sorbic ethyl ester (percent by weight) | 0 | 0.5 | 1 | 2 | 5 | 10 |
|---|---|---|---|---|---|---|
| Stress at 300% elongation (kg./cm.²) | 57 | 98 | 124 | 125 | 123 | 104 |
| Tensile strength (kg./cm.²) | 99 | 158 | 164 | 170 | 190 | 187 |
| Elongation at rupture (percent) | 450 | 420 | 375 | 393 | 414 | 457 |
| Permanent deformation after 200% elongation over a period of 24 hours, measured after one hour | 24 | 14 | 12 | 12 | 11 | 12 |

From table 4 it is seen that the results obtained by vulcanization with sorbic ethyl ester are even slightly better than those obtained when sorbic acid is used.

Sorbic acid, on the other hand, has the advantage of providing a better adhesion of the vulcanized polymer to metals.

What is claimed is:

1. A process of vulcanizing ethylene polymers consisting of forming a mixture of a ploymer selected from the group consisting of homo- and interpolymers of ethylene, a source of free radicals within the temperature range of 100–250° C., a filler, and 0.5–20% by weight of the polymer of a conjugated polyunsaturated compound having the general formula

wherein R represents a member of the class consisting of lower alkyl groups, and X represents a member of the class consisting of the carboxyl and ester groups, and heating the mixture to a temperature within the range of 100°–250° C.

2. Process according to claim 1, wherein the unsaturated compound is sorbic acid.

3. Process according to claim 1, wherein the unsaturated compound is an ethyl ester of sorbic acid.

4. Process according to claim 11, wherein the amount of unsaturated compound used is 0.5–20% by weight of the polymer.

5. Process according to claim 1, wherein the amount of unsaturated compound used is 1–5% by weight of the polymer.

6. Process according to claim 1, wherein the source of free radicals is a peroxide selected from the class consisting of dialkyl and diaralkyl peroxides.

7. Process according to claim 6, wherein there is used dicumyl peroxide.

8. Process according to claim 6, wherein the amount of peroxide used is 1–6% by weight of the polymer.

9. Shaped product comprising a polymer vulcanized in accordance with the process of claim 1.

10. A hydrocarbon polymer vulcanized in accordance with the process of claim 1, and wherein the mixture comprises carbon black and sorbic acid.

11. A process of vulcanizing substances composed of substantially saturated ethylene polymers which cannot be vulcanized by sulfur alone, consisting of forming a mixture of a saturated polymer selected from the group consisting of homo- and interpolymers of ethylene, a source of free radicals, at temperatures between 100 and 250° C., a filler, and no more than 20% of a conjugated polyunstaturated compound having the general formula $$R-CH=CH-CH=CHX$$

wherein R represents a member of the class consisting of lower alkyl groups, and X represents a member of the class consisting of the carboxyl and ester groups, and heating the mixture to a temperature within the range of 100°–250° C.

12. A process of vulcanizing a copolymer of ethylene and a substance selected from the group consisting of propylene and butylene-1, consisting of forming a mixture of the copolymer, a source of free radicals at temperatures between 100 and 250° C., a filler, and no more than 20% of conjugated polyunsaturated compound having the general formula $$R-CH=CH-CH=CHX$$

wherein R represents a member of the class consisting of lower alkyl groups, and X represents a member of the class consisting of the carboxyl and ester groups, and heating the mixture to a temperature within the range of 100°–250° C.

13. A process in accord with claim 1 wherein said mixture is heated to a temperature within the range of 120°–210° C.

14. A process in accord with claim 13 wherein said mixture is heated to a temperature within the range of 150°–170° C. during a period of 5–60 minutes.

15. A process in accord with claim 1 wherein said filler is selected from the group consisting of carbon black, silicon oxide, calcium carbonate, calcium silicate, aluminum silicate, and colloidal clay.

References Cited by the Examiner

UNITED STATES PATENTS

| 2,888,424 | 5/1959 | Precopio et al. | 260—41 |
|---|---|---|---|
| 2,916,481 | 12/1959 | Gilmont | 260—41 |
| 3,036,041 | 5/1962 | Tarbell | 260—42 |
| 3,111,500 | 11/1963 | Bartl | 260—41 |

FOREIGN PATENTS

| 1,200,144 | 12/1959 | France. |
|---|---|---|
| 1,225,704 | 2/1960 | France. |
| 853,640 | 11/1960 | Great Britain. |

ALEXANDER H. BRODMERKEL, *Primary Examiner.*

WILLIAM H. SHORT, MORRIS LIEBMAN, *Examiners.*

B. S. LEON, K. B. CLARKE, J. S. WALDRON,
*Assistant Examiners.*